Jan. 19, 1960   D. C. BORDEN ET AL   2,921,756
COMPOSITE AIRCRAFT
Filed April 20, 1956   4 Sheets-Sheet 1
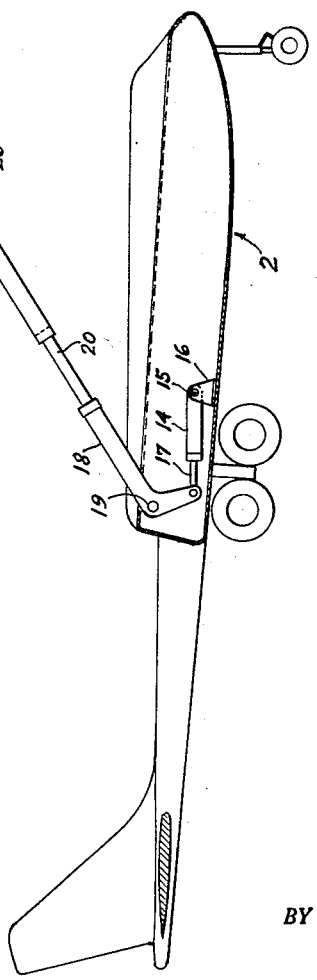
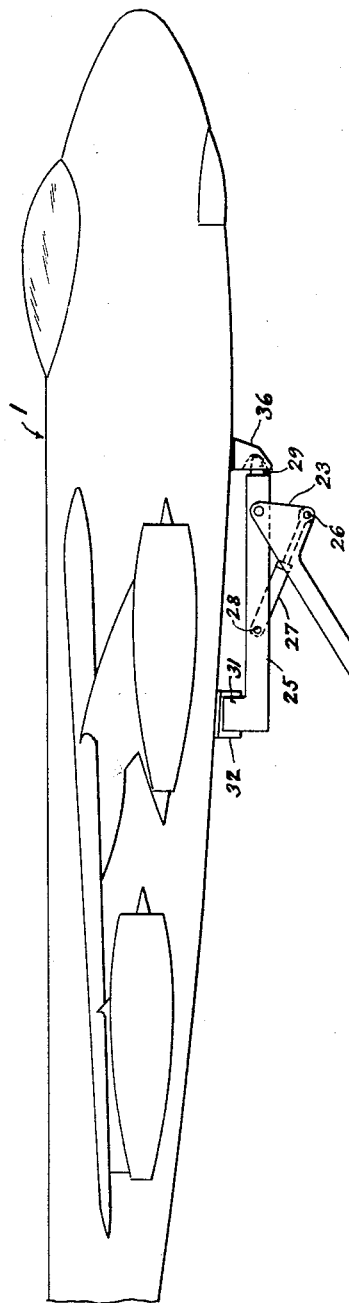
INVENTOR.
Darrel Borden C.
Edward Wolf
BY
*ATTORNEY*

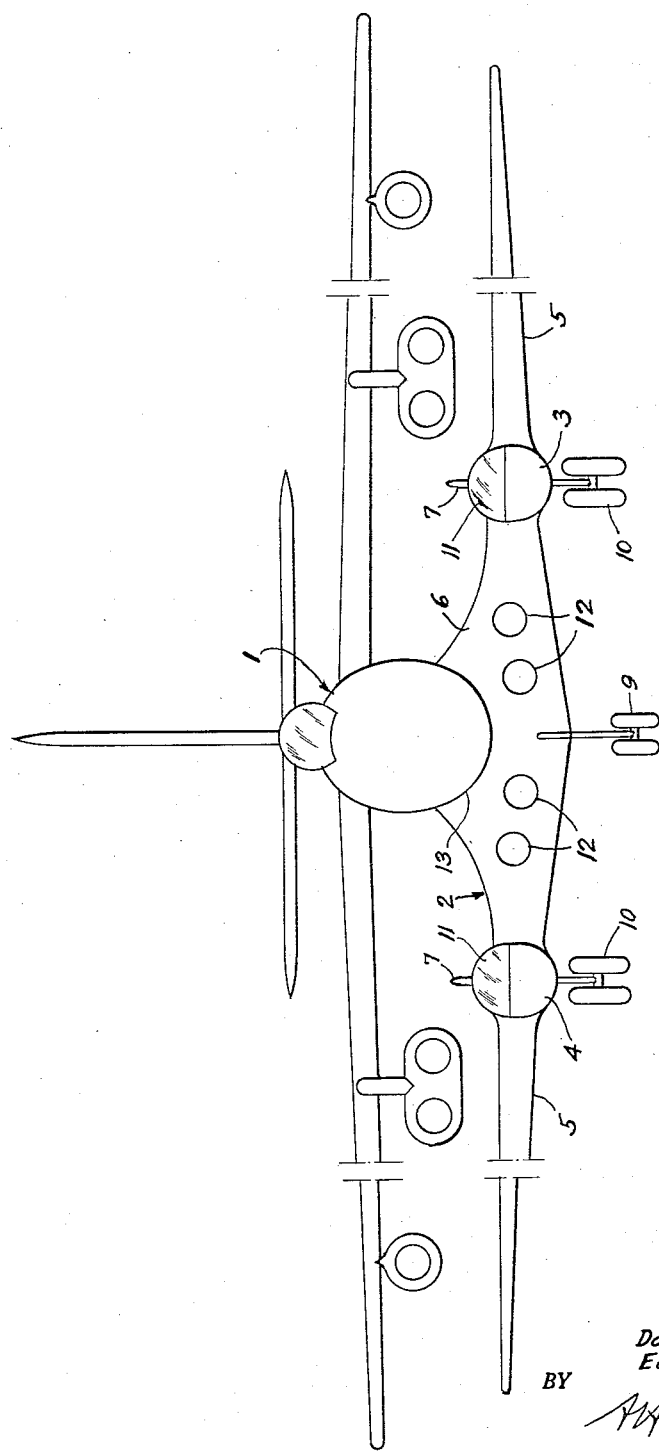

Jan. 19, 1960  D. C. BORDEN ET AL  2,921,756
COMPOSITE AIRCRAFT
Filed April 20, 1956  4 Sheets-Sheet 3
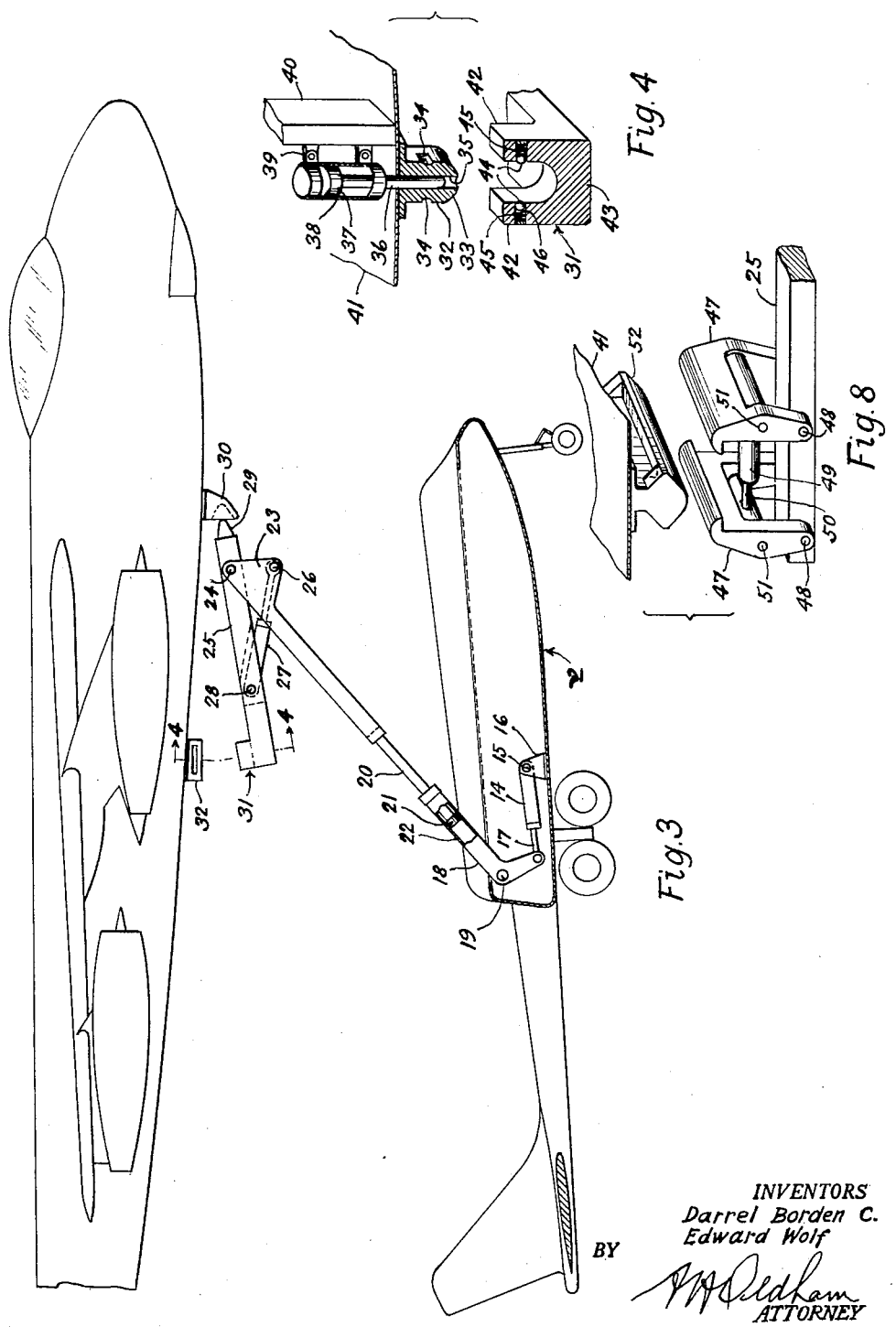
INVENTORS
Darrel Borden C.
Edward Wolf
BY
*M. H. Oldham*
ATTORNEY Jan. 19, 1960 D. C. BORDEN ET AL 2,921,756
COMPOSITE AIRCRAFT
Filed April 20, 1956 4 Sheets-Sheet 4
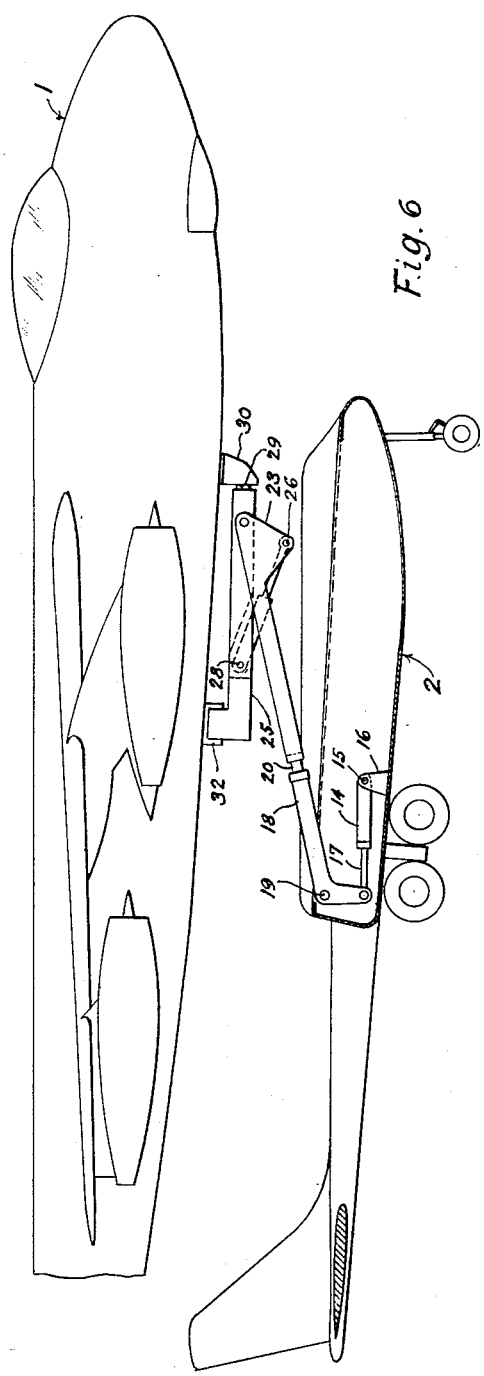
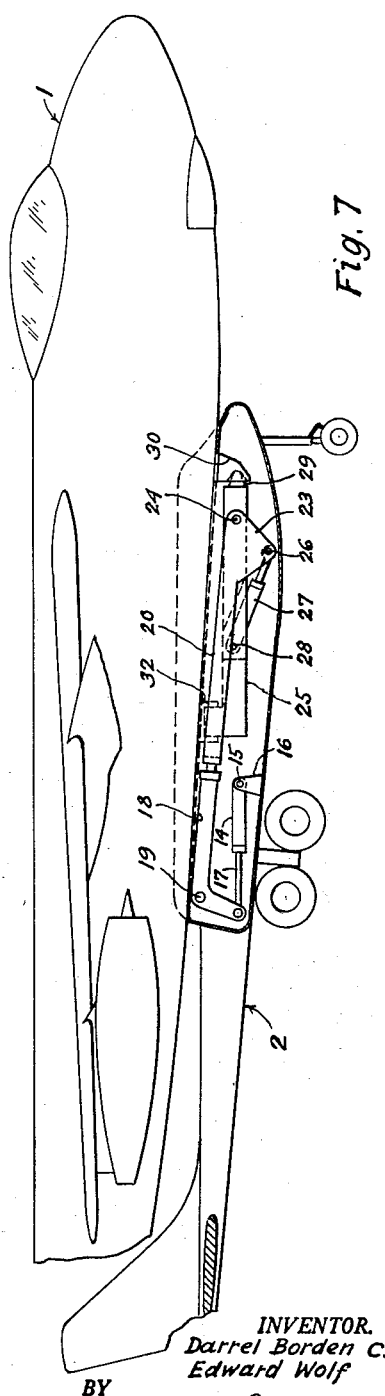
INVENTOR.
Darrel Borden C.
Edward Wolf
BY
A. W. Oldham
ATTORNEY United States Patent Office 2,921,756
Patented Jan. 19, 1960

2,921,756

COMPOSITE AIRCRAFT

Darrel C. Borden, Oak Ridge, Tenn., and Edward Wolf, Cuyahoga Falls, Ohio, assignors to Goodyear Aircraft Corporation, Akron, Ohio, a corporation of Delaware Application April 20, 1956, Serial No. 579,670

4 Claims. (Cl. 244—2)

This invention relates to a composite aircraft, and, more particularly, to a method and apparatus for taking off and landing a long-range or heavily loaded primary aircraft having no landing gear by attaching thereto during such operations an auxiliary aircraft having oversized landing gear.

The problem of increasing the range and payload of primary aircraft, such as bombers and cargo planes, has been the subject of considerable attention in the past. Solutions, such as variable wing span, in-flight fueling, and the like, have been proposed but all have attendant disadvantages. It is to the solution of this problem that the method and apparatus of this invention is directed.

The general object of the invention is to improve the operating characteristics of long-range and/or heavily loaded primary aircraft by elimination of weighty and bulky landing gear heretofore associated therewith.

A further object of the invention is to provide a method and apparatus for the takeoff and landing of such long-range primary aircraft not having landing gear integral therewith.

A yet further object of the invention is to provide a method and apparatus for such takeoff and landing that is simple, efficient, and economical.

Another object of the invention is the provision of an aircraft having a flying landing gear which can be detached after takeoff and flown back to base and which can be flown out and attached to the aircraft prior to landing.

The aforesaid objects of the invention, and other objects which will become apparent as the description proceeds, are achieved by providing an auxiliary aircraft having an oversized landing gear capable of sustaining a composite aircraft formed of both the primary and auxiliary aircraft. The primary aircraft, which is without landing gear, is placed atop the auxiliary aircraft in superimposed relation before take-off, and releasably attached thereto. The resulting composite aircraft, formed of the two independently self-powered and piloted aircraft, then takes off, and, after reaching a suitable altitude, the auxiliary aircraft is released from the primary aircraft and returned to ground base wherefrom it may be used for further take-offs or landings. Upon return of the same or another primary aircraft, the auxiliary aircraft takes off, is again attached to the primary aircraft in flight, and the composite aircraft is then landed.

In the drawings:

Fig. 1 is a pictorial bottom view of the composite aircraft;

Fig. 2 is a front elevational view of the composite aircraft;

Fig. 3 is a side view showing the initial approach step in engaging the auxiliary aircraft to the primary aircraft;

Fig. 4 is a fragmentary sectional view taken along line 4—4 of Fig. 3.

Fig. 5 is a view similar to that of Fig. 3 showing an intermediate step in engagement;

Fig. 6 is a view similar to that of Fig. 5 showing a further sequential step in engagement;

Fig. 7 is a view similar to that of Fig. 6 showing the final engagement position; and Fig. 8 is a fragmentary view similar to that of Fig. 4 showing another embodiment of the locking device of the invention.

In Fig. 1 a long-range self-powered and pilotable primary aircraft without landing gear is generally indicated by the numeral 1, and a self-powered and pilotable auxiliary aircraft by the numeral 2. The primary aircraft 1, in addition to the type shown, may be of any of the conventional types well-known in the aviation field and not particularly limited as to any particular design or disposition of engines, type of engines, fuselage, wings, or the like. The auxiliary aircraft 2 has a port fuselage 3 and a starboard fuselage 4. Extending outward of the outboard sides of the fuselages 3 and 4 and forwardly located thereon are wings 5. Between the fuselages 3 and 4, a central bridging section 6 is provided. At the rear of the fuselages 3 and 4 is a conventional empannage formed of twin-tail fins 7 and a connecting stabilizer 8. The auxiliary plane landing gear may be of any conventional design and, for example, is illustrated as the "tricycle" type with a forward wheel set 9 and two rearward sets 10. The landing gear components are designed oversize and are capable of sustaining both the primary aircraft and the auxiliary aircraft 2 which together form the composite aircraft of Fig. 1. Each of the fuselages 3 and 4 is provided at the forward end thereof with control and observation compartments as indicated by the canopies 11. Preferably jet propulsion is utilized with the jet engines located in the bridging section 6 as indicated by the intake openings 12.

As is best seen in Fig. 2, the primary aircraft 1 lies in superimposed relation with the auxiliary aircraft 2 in a shaped supporting cradle 13 formed on the upper surface of the bridging section 6.

The apparatus and method for releasably attaching the primary aircraft to the auxiliary aircraft is shown in Figs. 3 through 7. In the Fig. 3, a hydraulic cylinder 14 is pivoted by a pin 15 at the base thereof to a structural member 16 in the bridging section of the auxiliary aircraft 2. The end of the piston rod 17 of the cylinder 14 is pivotally secured to a bell-crank lever 18 mounted on the structural framework of the aircraft 2 by a pin 19. The other end of the lever 18 forms a hydraulic cylinder 22 in which moves a piston 21 fastened to one end of the rod 20, the other end of which forms a forked extension ending in triangular plates 23. The hydraulic cylinder 20 is actuated by fluid pressure from a pressure source (not shown) and controllable from the auxiliary aircraft.

The triangular plates 23 are pivotally secured at an apex thereof by a pin 24 to a bar 25 adjacent one end thereof. The remaining apex has mounted thereon by a pin 26, a second hydraulic cylinder 27. The base end of the cylinder 27 is secured to the bar 25 at a point intermediate thereon by a pin 28. At the forward end of the bar 25, a shaped nosepiece 29 is provided with a matching receptacle 30 therefor mounted on the underbelly of the primary aircraft 1. At the rearward end of the bar 25, a locking yoke assembly 31 is shown with an interlocking tongue 32 therefor also affixed to the underbelly of the primary aircraft 1.

Fig. 4 illustrates in greater detail a cross-section of the yoke assembly 31 and the tongue 32 along the line 4—4 of Fig. 3. The tongue 32 has a rounded end 33, two side grooves 34, and a central, vertically-directed bore 35 passing therethrough. Within the bore 35 a piston rod 36 freely slides and is actuated by a piston 37 within a hydraulic cylinder 38 affixed by the lugs 39 to a structural member 40 of the primary aircraft 1. For purposes of clarity, a fragmentary portion 41 of the underbelly of the primary aircraft 1 is also shown.

The yoke assembly 31 is formed of two upstanding legs 42 connected by a bottom section 43 in a general U-shape. Adjacent the ends of the legs 42 and on the inwardly facing side of each, locking balls 44 are provided which are loaded by springs 45 within their respective bores 46; the operation of which will become apparent as the description proceeds.

In the operation of the attaching gear of Fig. 3, the cross-bar 25 is raised above the aircraft 2 by controlled fluid pressure means (not shown and conventional in the art) acting within the hydraulic cylinders 14 and 22.

Prior to this or simultaneously therewith, the cylinder 27 is actuated to minimize the angle between the cross-bar 25 and the rod 20, thus pointing the nosepiece 29 in an upwardly inclined direction as shown in Fig. 3. Dependent on the locale of the operation, as will be more evident hereinafter, either the primary aircraft 1 or the auxiliary aircraft 2 is moved so as to insert the nosepiece 29 within the matching receptacle 30. At this point, the yoke assembly 31 is located some distance below the tongue 32.

As shown in Fig. 5, as the distance between the aircraft is closed, and/or as cylinder 27 is actuated, the yoke assembly 31 contacts and locks on the tongue 32. This is effected by the seating of the spring-loaded balls 44 within the grooves 34 of Fig. 4. As the gap between the aircraft continues to close, the position of Fig. 6 is reached. Final nesting of the two aircraft 1 and 2 to form a composite aircraft is shown in Fig. 7.

Fig. 8 shows another type of linking device like that shown in Fig. 4, which may be utilized at the locking end of the cross-bar 25 of Fig. 3. Two spaced opposed jaws 47 are pivotally mounted by means of pins 48 to the cross-bar 25. A double-acting hydraulic cylinder 49 having piston rods 50 extending from each end thereof is located between the jaws 47 with the rods 50 each secured by a pivot 51 to a respective jaw. In operation, as the previously described movement of the cross-bar 25 occurs, a T-shaped member 52, mounted on the underbelly surface 41 of the primary aircraft, enters into the space between the jaws 47. The cylinder 49 is then actuated by conventional means (not shown) from the auxiliary aircraft to cause the jaws 47 to close upon the member 52 and thereby lock thereon. The device of Fig. 8 offers a further advantage over that of Fig. 4, in that a positive locking action is maintained between the primary and auxiliary aircraft.

In the method of the invention, the primary aircraft 1 may be stored on the auxiliary aircraft 2 or on wheeled dollys (not shown) at a ground base. When the take-off operation is to be commenced, the primary aircraft, if stored on a dolly, is wheeled below an overhead lifting device, such as a portable crane, and is lifted sufficiently so that the auxiliary aircraft may be placed therebeneath. The sequential steps illustrated in Figs. 3 and 5 through 7 and described hereinbefore, are then effected to form the composite aircraft as shown in Fig. 1. Upon the composite aircraft becoming airborne to a sufficient altitude, usually with the engines of both the auxiliary and primary aircraft operating, the hydraulic cylinder 38 of Fig. 4 is actuated to move the rod 36 downwards and force the yoke assembly 31 free of the tongue 32. The nosepiece 29 of Fig. 3 is then freed of the receptacle 30 by suitable manipulation of the hydraulic cylinders 14 and 27 or by speeding up the primary aircraft, and the auxiliary aircraft is then free to land at or operate from the ground base preparatory to attachment to the same or another primary aircraft for purposes of take-off or landing.

Upon the return of the primary aircraft 1 from its destination, the auxiliary aircraft 2 takes off from ground base and approaches the underside of the primary aircraft 1 in flight. Again, as shown in Figs. 3 and 5 through 7, and described hereinbefore, the two aircraft are joined and the composite aircraft landed. The primary aircraft 1 may then be detached, if desired, with the auxiliary aircraft again becoming airborne to land any remaining airborne primary aircraft.

As will be obvious to one skilled in the art, various modifications of the embodiments shown may be effected without departing from the scope and spirit of the invention described herein. Instead of a jet propulsion drive for the auxiliary aircraft as shown and described hereinbefore, conventional propeller drive may be utilized by providing a powerplant and propellers in the forward section of the fuselages of the auxiliary aircraft and eliminating the jet propulsion drive housed as described in the center bridging section. Likewise, instead of the jet engines in the bridging section, said engines may be located in the fuselage sections in a manner well known in the art. Furthermore, the attachment gear hereinbefore described may be simplified so as to substantially leave the primary aircraft further free of parts thereof thereby effecting even more weight reduction with respect to the primary aircraft.

As will now be evident the objects of the invention have been achieved by the described method and apparatus of the invention. Primary aircraft are relieved of the weight penalty heretofore associated with the landing gear and associated controls and structural details required therefor, which may range approximately 5–7% of the gross weight of the aircraft. As the fuel weight of a bomber type aircraft is approximately 40% of the gross weight, the method and apparatus of the invention affords an increase of approximately 15–20% in fuel capacity or range. Other advantages such as increased lift power with resulting decrease in take-off run and rate-of-climb, complete use in the primary aircraft of ram-jet propulsion, elimination of design compromises in the primary aircraft due to landing-gear problems, elimination of landing flaps, and the like, further increase the range of said primary aircraft appreciably. Furthermore, the landing gear of the auxiliary aircraft can now be designed for merely take-off and landing operation eliminating cruising considerations such as provisions for retraction of landing gear for aerodynamic reasons, and the like, and permitting greater flexibility than that heretofore available in the construction and design thereof.

While certain representative embodiments and details have been shown for the purpose of illustrating the invention, it will be apparent to those skilled in this art that various changes and modifications may be made therein without departing from the spirit or scope of the invention.

What is claimed:

1. In combination, a self-powered and pilotable auxiliary aircraft, a long-range self-powered and pilotable primary aircraft, said primary aircraft being without landing gear, said auxiliary aircraft having an extra strong landing gear capable of sustaining a composite aircraft formed of both the auxiliary and primary aircraft, telescoping rod means carried by the auxiliary aircraft, means for extending and contracting said rod means, means for moving the rod means upwardly and forwardly at a controlled angle from the auxiliary aircraft, means on the upper end of the rod means for securing the upper end of the rod means to the primary aircraft, and cradle means between the primary and auxiliary aircraft for positioning them together when held in assembled position by the contraction and downward swinging movement of the rod means, said auxiliary aircraft being capable of taking off and landing independently of the primary aircraft and serving as a flying landing gear therefor.

2. In combination, a self-powered and pilotable auxiliary aircraft, a long-range self-powered and pilotable primary aircraft, said primary aircraft being without landing gear, said auxiliary aircraft having landing gear capable of sustaining a composite aircraft formed of both the auxiliary and the primary aircraft, said auxiliary aircraft having an upper supporting surface adapted to receive the primary aircraft thereupon, an elongated arm formed of a first and a second section coaxially aligned and arranged to coengage to vary the arm length, means pivotally attaching one end of the arm to the auxiliary aircraft, means to controllably elevate the other end of the arm above and forwardly of the auxiliary aircraft, and means for releasably attaching the elevatable end of the arm to said primary aircraft.

3. The combination in a composite aircraft, of a primary airplane and a secondary airplane, both airplanes being independently powered and piloted, a landing gear on only the secondary airplane, and means releasably securing the primary airplane on the back of the secondary airplane, said means including a long narrow fluid pressure motor having a cylinder member and a rod member, a bell crank pivotally securing one member to the secondary airplane, a fluid pressure motor carried by the secondary airplane and connected to the bell crank to move the first-named fluid pressure motor from an upwardly inclined position to a position substantially inside the top of the secondary airplane, a pin pivotally carried at the end of the other member, power means for controlling the angular position of the pin on said other member, a cup carried by the primary airplane and into which the one end of the pin fits, and interlocking means on the primary airplane and releasably latching with the other end of the pin.

4. The combination in a composite aircraft, of a primary airplane and a secondary airplane, both airplanes being independently powered and piloted, a landing gear on only the secondary airplane, and means releasably securing the primary airplane on the back of the secondary airplane, said means including a long narrow fluid pressure motor pivotally secured to the secondary airplane, means for swinging the motor angularly to and from the secondary airplane, a pin pivotally carried by the unpivoted end of the motor, power means for controlling the angular position of the pin, a cup carried by the primary airplane and into which the one end of the pin fits, and interlocking means on the primary airplane and releasably latching with the other end of the pin.

References Cited in the file of this patent

UNITED STATES PATENTS

| | | |
|---|---|---|
| 2,072,029 | Crowe | Feb. 23, 1937 |
| 2,471,599 | Young | Mar. 31, 1949 |
| 2,797,881 | Andrews | July 2, 1957 |

FOREIGN PATENTS

| | | |
|---|---|---|
| 566,201 | Great Britain | Dec. 19, 1944 |

OTHER REFERENCES

"Western Aviation," volume 33, I ss. 10, page 56, October 1953.